(12) United States Patent
Yoo

(10) Patent No.: US 11,922,411 B2
(45) Date of Patent: Mar. 5, 2024

(54) SMART CARD FOR GENERATING AND PROVIDING VIRTUAL CODE, AND METHOD AND PROGRAM THEREFOR

(71) Applicant: SSENSTONE INC., Seoul (KR)

(72) Inventor: Chang-Hun Yoo, Seoul (KR)

(73) Assignee: SSENSTONE INC., Seoul (KR)

( * ) Notice: Subject to any disclaimer, the term of this patent is extended or adjusted under 35 U.S.C. 154(b) by 343 days.

(21) Appl. No.: 16/906,606

(22) Filed: Jun. 19, 2020

(65) Prior Publication Data

US 2020/0320526 A1    Oct. 8, 2020

Related U.S. Application Data

(63) Continuation of application No. PCT/KR2019/009760, filed on Aug. 6, 2019.

(30) Foreign Application Priority Data

Aug. 9, 2018  (KR) .................. 10-2018-0093349
Aug. 2, 2019  (KR) .................. 10-2019-0094493

(51) Int. Cl.
*G06Q 20/00*  (2012.01)
*G06F 1/14*   (2006.01)
(Continued)

(52) U.S. Cl.
CPC ............. *G06Q 20/385* (2013.01); *G06F 1/14* (2013.01); *G06F 12/10* (2013.01); *G06F 21/60* (2013.01);
(Continued)

(58) Field of Classification Search
CPC ............. G06Q 20/341; G06Q 20/349; G06Q 20/3572; G06K 19/07707
See application file for complete search history.

(56) References Cited

U.S. PATENT DOCUMENTS 6,000,832 A    12/1999 Franklin et al.
8,925,806 B2 *  1/2015 Bonalle .............. G06K 19/0723
                                             235/375
(Continued)

FOREIGN PATENT DOCUMENTS

CN    110827020    *  2/2021
EP    2 118 805 A2   11/2009
(Continued)

OTHER PUBLICATIONS

Enhancement of NTSA Secure Communication With One-Time Pad (OTP) in IOT Ali Hasan Aidaros Alattas, Mahmood A. Al-Shareeda, Selvakumar Manickam, Murtaja Ali Saare Informatica 47 (2023) 1-10 (Year: 2023).*

(Continued)

*Primary Examiner* — Richard C Weisberger
(74) *Attorney, Agent, or Firm* — Studebaker & Brackett PC

(57) ABSTRACT

Disclosed are a smart card for generating and providing a virtual code, and method and program therefor. A method for generating and providing a smart card-based virtual code includes receiving, by the smart card, first power from the outside, generating, by the smart card, the virtual code based on a time count using the first power, and providing, by the smart card, the virtual code to the outside, in which the virtual code is a virtual card number or a virtual token, generated as a code matching an actual card number by a virtual code generation function previously stored in the smart card, and used to search for the actual card number in a financial company server or a virtual code verification server, the time counter is counted and measured from an initial time value provided at the time of manufacturing the card by a time measurement module included in the smart card, and the time measurement module includes a clock that (Continued)

measures the time data and a clock battery that supplies second power to the clock.

8 Claims, 12 Drawing Sheets

(51) Int. Cl.
*G06F 12/10* (2016.01)
*G06F 21/60* (2013.01)
*G06Q 20/34* (2012.01)
*G06Q 20/38* (2012.01)
*G06Q 20/40* (2012.01)
*H04L 9/40* (2022.01)
*G06K 19/07* (2006.01)

(52) U.S. Cl.
CPC ......... *G06Q 20/341* (2013.01); *G06Q 20/343* (2013.01); *G06Q 20/352* (2013.01); *G06Q 20/353* (2013.01); *G06Q 20/38* (2013.01); *G06Q 20/40* (2013.01); *G06Q 20/401* (2013.01); *G06Q 20/40145* (2013.01); *H04L 63/0838* (2013.01); *H04L 63/0853* (2013.01); *G06F 2212/65* (2013.01); *G06K 19/0701* (2013.01); *G06K 19/0723* (2013.01)

(56) References Cited

U.S. PATENT DOCUMENTS

| | | | | |
|---|---|---|---|---|
| 9,684,861 | B2 * | 6/2017 | Mullen | G06K 19/06187 |
| 9,727,759 | B1 * | 8/2017 | Essebag | G07F 7/0813 |
| 2006/0107067 | A1 | 5/2006 | Safal et al. | |
| 2006/0242698 | A1 * | 10/2006 | Inskeep | G06Q 20/4014 |
| | | | | 726/20 |
| 2009/0048971 | A1 | 2/2009 | Hathaway et al. | |
| 2012/0330764 | A1 * | 12/2012 | Nahidipour | G06Q 20/3278 |
| | | | | 705/17 |
| 2014/0129435 | A1 * | 5/2014 | Pardo | G06Q 20/227 |
| | | | | 705/41 |
| 2014/0279555 | A1 * | 9/2014 | Guillaud | G06Q 20/341 |
| | | | | 705/65 |

FOREIGN PATENT DOCUMENTS

| | | | | |
|---|---|---|---|---|
| EP | 2 330 787 | A1 | 6/2011 | |
| FR | 2805422 | A1 * | 8/2001 | ........... G06Q 20/341 |
| JP | H11-195102 | A | 7/1999 | |
| JP | 2005-050292 | A | 2/2005 | |
| JP | 2005-182192 | A | 7/2005 | |
| JP | 2008-269342 | A | 11/2008 | |
| JP | 2009-031940 | A | 2/2009 | |
| JP | WO2015115075 | A1 | 3/2017 | |
| JP | 2018-050434 | A | 3/2018 | |
| JP | 2018-056831 | A | 4/2018 | |
| KR | 1020020096353 | A | 12/2002 | |
| KR | 101316466 | B1 | 10/2013 | |
| KR | 1020150005788 | A | 1/2015 | |
| KR | 101583515 | B1 | 1/2016 | |
| KR | 1020160036471 | A | 4/2016 | |
| KR | 10-1675927 | B1 | 11/2016 | |
| KR | 2020170001400 | U | 4/2017 | |
| WO | 2008-004312 | A1 | 1/2008 | |
| WO | WO-2018029581 | A1 * | 2/2018 | ........... G06K 19/073 |

OTHER PUBLICATIONS

Multi-Factor Authentication for Net Banking Neenu Ann Shaji1, Sumitha Soman International Journal of System and Software Engineering vol. 5 Issue 1, Jun. 2017 ISSN.: 2321-6107 (Year: 2017).*
Written Opinion issued by Intellectual Property Office of Singapore in SG Patent Application No. 11202006096V; dated Jul. 13, 2021.
An Office Action; "Notice of Reasons for Refusal", mailed by the Japanese Patent Office dated May 10, 2022, which corresponds to Japanese Patent Application No. 2021-506752 and is related to U.S. Appl. No. 16/906,606.
The extended European search report issued by the European Patent Office dated Aug. 27, 2021, which corresponds to European Patent Application No. 19848742.3-1213 and is related to U.S. Appl. No. 16/906,606.
International Search Report issued for PCT/KR2019/009760, dated Oct. 31, 2019.
Written Opinion of the International Searching Authority issued for PCT/KR2019/009760, dated Oct. 31, 2019.

* cited by examiner

SMART CARD FOR GENERATING AND PROVIDING VIRTUAL CODE, AND METHOD AND PROGRAM THEREFOR

CROSS-REFERENCE TO RELATED APPLICATION

This application is a Bypass Continuation of International Application No. PCT/KR2019/009760, filed Aug. 6, 2019 and published as WO2020/032517 on Feb. 13, 2020, which claims priority to Korean patent application Serial No. 10-2018-0093349 filed on Aug. 9, 2018 and Korean patent application Serial No. 10-2019-0094493 filed on Aug. 2, 2019, the contents of which are hereby incorporated by reference in their entirety.

TECHNICAL FIELD

The present disclosure relates to a smart card for generating and providing a virtual code, and a method and program therefor, and more specifically, to a smart card for generating and providing a virtual code that can make payment by generating the virtual code that is generated without duplication at each time point and providing the generated virtual code to the outside, and a method and program therefor.

BACKGROUND ART

Code type data have been used in many areas. Not only a card number and an account number used during payment, but also an IPIN number, a resident registration number, and the like for user identification are the code type data.

However, data leakage accidents frequently occur during a use of such code data. In the case of the card number, an actual card number is written on a surface of a card as it is, and thus is visually leaked to others, and when payment is made using magnetic, the card number is transferred to a POS device as it is and leaked.

Many attempts have been made to use a virtual card number to prevent the actual card number from leaking as it is, but data for identifying a user is required to search for the actual card number corresponding to the virtual card number. For example, in the case of one time password (OTP), a code is changed and generated every time, but the OTP requires a login procedure to determine algorithm assigned to a user and therefore is difficult to apply to various areas.

Meanwhile, an integrated circuit card (IC card) is a card in which a semiconductor memory device (IC memory) is inserted into a credit card, a cash card, and the like. The IC card includes an IC connector or an antenna that can communicate with an external device to transfer information stored in the IC memory, is inserted into a card reader, or uses short-range wireless communication technology.

DISCLOSURE

Technical Problem

The problem to be solved by the present disclosure is to provide a smart card for generating and providing a virtual code that can search for a real card number without exposing actual card information during payment using a card, and a method and program therefor.

In addition, the problem to be solved by the present disclosure is to provide a smart card for generating and providing a virtual code that is generated without duplication whenever a payment using the smart card is requested, and a method and program therefor.

In addition, the problem to be solved by the present disclosure is to provide a smart card for generating and providing a virtual code that can be used instead of actual card information while maintaining the existing payment system and device as they are, and a method and program therefor.

The problems of the present disclosure are not limited to the above-mentioned technical objects, and other problems that are not mentioned will be clearly understood by those skilled in the art through the following descriptions.

Technical Solution

According to an aspect of the present disclosure to solve the above-mentioned problem, a smart card for generating and providing a virtual code includes a communication interface that is supplied with first power from an external device and can communicate with the external device, a time measurement module that measures time data from an initial time value provided based on a specific time point, a virtual code generation unit that generates the virtual code based on a time count counted based on the time data using the first power, and a virtual code providing unit that provides the virtual code to the outside and includes the communication interface, in which the virtual code is a virtual card number or a virtual token, generated as a code matching an actual card number by a virtual code generation function previously stored in the smart card, and used to search for the actual card number in a virtual code verification server, and the time measurement module includes a clock that measures the time data and a clock battery that supplies second power to the clock.

In addition, the communication interface includes at least one of an IC connector and an antenna, and the IC connector is supplied with the first power from the external device by physically contacting the external device when the smart card is used as a contact type, and the antenna is supplied with the first power from the external device without physically contacting the external device when the smart card is used as a contactless type.

In addition, the external device is a user terminal, and the smart card is tagged to the user terminal to be supplied with the first power.

In addition, the virtual code providing unit includes a display unit, and outputs the virtual code to the display unit in a code value or an image code form.

In addition, the smart card further includes a fingerprint recognition unit that recognizes a user's fingerprint to check usage authority, in which the virtual code generation unit generates the virtual code only when the fingerprint recognized by the fingerprint recognition unit matches previously registered fingerprint information.

In addition, it is verified whether the first time count measured by the time measurement module matches a second time count measured by the virtual code verification server, and it is determined that the first time count matches the second time count when a difference between the first time count and the second time count is within a specific error range.

In addition, the virtual code verification server stores and manages a time correction value in a unit count matching the actual card number, the time correction value is specified based on an error history measured for each user, and the first time count is verified by reflecting the time correction value.

In addition, the virtual code may be generated by combining a plurality of detailed codes.

In addition, the plurality of detailed codes include: a first code that sets a start point at which a storage location is searched; and a second code that sets a search path from the start point to the storage location according to a specific search scheme.

According to another aspect of the present disclosure to solve the above-mentioned problem, a method for generating and providing a smart card-based virtual code includes receiving, by the smart card, first power from the outside, generating, by the smart card, the virtual code based on a time count using the first power, and providing, by the smart card, the virtual code to the outside, in which the virtual code is a virtual card number or a virtual token, generated as a code matching an actual card number by a virtual code generation function previously stored in the smart card, and used to search for the actual card number in a virtual code verification server, the time count is counted based on time data measured from an initial time value provided based on a specific time point by a time measurement module included in the smart card, and the time measurement module includes a clock that measures the time data and a clock battery that supplies second power to the clock.

In addition, the smart card includes at least one of an IC connector and an antenna, and the IC connector is supplied with the first power from an external device by physically contacting the external device when the smart card is used as a contact type, and the antenna is supplied with the first power from the external device without physically contacting the external device when the smart card is used as a contactless type.

In addition, the external device is a user terminal, and in the receiving of the first power from the outside, the smart card is tagged to the user terminal to be supplied with the first power.

In addition, the smart card includes a display unit, and in the providing of the virtual code to the outside, the virtual code is output to the display unit in a code value or an image code form.

In addition, the method further includes recognizing, by the smart card, a user's fingerprint to check usage authority, in which the smart card generates the virtual code only when the recognized fingerprint matches previously registered fingerprint information.

In addition, it is verified whether a first time count measured by the smart card matches a second time count measured by the virtual code verification server, and it is determined that the first time count matches the second time count when a difference between the first time count and the second time count is within a specific error range.

In addition, the virtual code verification server stores and manages a time correction value in a unit count matching the actual card number, the time correction value is specified based on an error history measured for each user, and the first time count is verified by reflecting the time correction value.

In addition, the virtual code may be generated by combining a plurality of detailed codes.

In addition, the plurality of detailed codes include: a first code that sets a start point at which a storage location is searched; and a second code that sets a search path from the start point to the storage location according to a specific search scheme.

According to another aspect of the present disclosure for solving the above-described problems, a program for generating and providing a smart card-based virtual code is stored in a medium to execute a method for generating and providing the smart card-based virtual code in combination with a computer that is hardware.

Other specific details of the present disclosure are included in the detailed description and drawings.

Advantageous Effects

According to the present disclosure, since the payment is made using the smart card uses virtual code, that is, the virtual card number, the virtual token, or the like instead of the actual card information, the actual card information can be prevented from being leaked.

In addition, according to the present disclosure, it is possible to generate the virtual code without duplication because the virtual code is generated based on a different time count whenever each payment is requested, so the damage due to the leakage can be prevented and the effect that the actual card information is not leaked is provided.

In addition, according to the present disclosure, since the virtual code of the same format as the actual card number is used, the existing payment process using the actual card number can be maintained as it is. For example, when the virtual card number is generated and provided without duplication in an application providing a financial transaction service, the POS device and the PG company server are maintained as they are and the virtual card number is transferred to the token service server or the financial company server, and the token service server or the financial company server can search for the actual card number corresponding to the virtual card number to make the payment. Thereby, the portion to be changed in the existing process in order to increase security can be minimized, and the user does not need to perform a separate step to improve security.

Effects of the present disclosure are not limited to the above-mentioned effects, and other effects that are not mentioned will be clearly understood by those skilled in the art from the following descriptions.

MODE FOR DISCLOSURE

Figure 1:
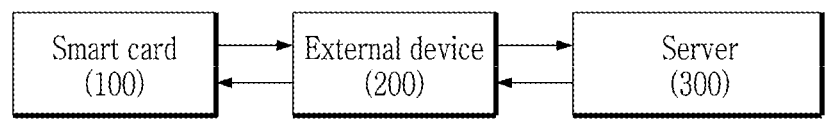
FIG. 1 is a block diagram of a system for generating and providing a smart card-based virtual code according to an embodiment of the present disclosure.

Various advantages and features of the present disclosure and methods accomplishing them will become apparent from the following description of embodiments with reference to the accompanying drawings. However, the present disclosure is not limited to the embodiments disclosed herein, but will be implemented in various forms. The embodiments make contents of the present disclosure thorough and are provided so that those skilled in the art can easily understand the scope of the present disclosure. Therefore, the present disclosure will be defined by the scope of the appended claims.

Terms used in the present specification are for explaining the embodiments rather than limiting the present disclosure. In the present disclosure, a singular form includes a plural form unless explicitly described to the contrary. Throughout this specification, the term "comprise" and/or "comprising" will be understood to imply the inclusion of stated constituents but not the exclusion of any other constituents. Like reference numerals refer to like elements throughout the specification and "and/or" includes each of the components mentioned and includes all combinations thereof. Although "first", "second" and the like are used to describe various components, it goes without saying that these components are not limited by these terms. These terms are used only to distinguish one component from other components. Therefore, it goes without saying that the first component mentioned below may be the second component within the technical scope of the present disclosure.

Unless defined otherwise, all terms (including technical and scientific terms) used in the present specification have the same meaning as meanings commonly understood by those skilled in the art to which the present disclosure pertains. In addition, terms defined in commonly used dictionary are not ideally or excessively interpreted unless explicitly defined otherwise.

In this specification, a "smart card" means a card capable of generating and providing a virtual code. In addition, the smart card is any card that can perform a financial transaction, such as a credit card, check card, or cash card, and the type and purpose of the card are not limited.

In this specification, a "character" is a component configuring a code, and includes all or part of uppercase and lowercase alphabets, numbers, and special characters.

In the specification, a "code" means a character string in which characters are listed.

In this specification, a "card number" is used for financial transactions such as payment, and refers to a number given to a card and delivered to a card company in situations such as payment and payment cancellation.

In this specification, the "actual card number" is a number assigned to a specific user's card by a card company. That is, the actual card number means a number assigned to a general physical card, a mobile card, and the like.

In this specification, the "virtual code" is a card number that is temporarily generated to be linked to an actual card number, and is a code of a specific digit composed of characters including numbers. The virtual code includes a virtual card number used to search for the actual card number in a financial company server, a virtual token used to search for the actual card number in a virtual token verification server, and the like.

In this specification, a "detailed code" means some codes included in the virtual code. That is, when the virtual code is generated by combining a plurality of codes separately generated, the detailed code means individual codes configuring the virtual code by being separately generated.

In the present specification, a "unit count" is a unit defined as being set to a specific time interval and changed as the time interval elapses. For example, 1 count may be set to be a specific time interval (for example, 1.5 seconds), and used.

In this specification, a "virtual code generation function" means a function used to generate a virtual code.

In this specification, a "detailed code generation function" means a function used to generate each detailed code configuring the virtual code.

In this specification, a "detailed code combination function" means a function that combines or couples a plurality of detailed codes to generate a virtual code (for example, a virtual card number or a virtual token).

In the present specification, a "user terminal" is any device capable of providing a result to a user by performing arithmetic processing. For example, a computer may correspond to a desktop PC, a notebook, as well as a smart phone, a tablet PC, a cellular phone, a personal communication service phone (PCS phone), a mobile terminal of the synchronous/asynchronous Mobile terminals International Mobile Telecommunication-2000 (IMT-2000), a palm personal computer (PC), a personal digital assistant (PDA), and the like, but is not limited thereto.

In this specification, "short-range wireless communication" means a wireless communication technology that performs communication wirelessly as a physically separated terminal is in contact or proximity. For example, the short-range wireless communication may correspond to a wireless communication method in a state in which a plurality of terminals are located within a range that can be controlled by hand while a user directly checks the terminals.

Hereinafter, embodiments of the present disclosure will be described with reference to the accompanying drawings.

FIG. 1 is a block diagram of a system for generating and providing a smart card-based virtual code according to an embodiment of the present disclosure.

Referring to FIG. 1, a system for generating and providing a smart card-based virtual code according to an embodiment of present disclosure includes a smart card 100 and an external device 200, and may further include a server 300 as necessary.

The smart card 100 is a card that can perform a financial transaction, and is a card that performs a financial transaction using a virtual code instead of actual card information. In addition, the smart card is any card that can perform financial transactions, such as a credit card, check card, or cash card, and the type and purpose of the card are not limited.

In addition, a material of the smart card 100 is a metal material, and is any material such as stainless steel, titanium, aluminum, and an amorphous alloy or a non-metal material, but is not limited to the above-described examples.

In the present disclosure, the smart card 100 serves to directly generate a virtual code used for a financial transaction without receiving data from outside. The smart card 100 operates only when the financial transaction is requested to generate and provide a virtual code, and power ("first power" in this specification) required for generating and providing the virtual code is supplied from the outside. That is, the smart card 100 does not need to have a separate battery to supply power required for generating and providing the virtual code. Therefore, the manufacturing cost of the smart card 100 can be reduced, and the use of the smart card 100 is not restricted due to the life of the battery.

In one embodiment, the smart card 100 does not include a battery that supplies power for driving other components in addition to power ("second power" in this specification) for driving a clock 121 for measuring time. That is, all of the power for driving a configuration other than the clock 121 in the smart card 100 is the first power that is supplied from the outside when a financial transaction request is made by a user, and the smart card 100 may include only a clock battery 122 that supplies the second power for driving the clock 121.

The form in which the smart card 100 is supplied with power from the outside varies depending on whether the financial transaction request method is made in a contact type, a contactless type, or the like, and a detailed description thereof will be described below.

The smart card 100 measures time data from an initial time value given based on a specific time point. In addition, the virtual code is generated based on a time count counted based on the time data.

The time data used for generating the virtual code is also measured directly on the smart card 100 itself without being received from the outside. At this time, the time data needs to be continuously measured from the specific time point (for example, time point to start using a card or time point to manufacture a card) as well as the time when the financial transaction is requested. That is, if the smart card does not measure the present time, a server may not be able to generate a normal virtual code that can be determined to be valid at the present time. Therefore, the smart card continues to measure time even when external power is not provided to obtain the same time point as the server.

The clock battery 122 may be a battery having a capacity capable of driving only the clock 121 for a specific period. For example, if the expiration date of the smart card 100 is set to 5 years from the production time of the smart card 100 or when the user starts using the smart card 100, the smart card 100 may include the clock battery 122 that can drive the clock 121 for measuring time for 5 years.

The time data measured by the clock 121 plays a key role in verifying whether the virtual code is normally validly generated when the financial transaction is requested. A detailed description of a time measurement module 120 including the clock 121 and the clock battery 122 will be described below.

In addition, the smart card 100 serves to provide the generated virtual code to the outside. There is no limitation in a form in which the smart card 100 provides the virtual code to the outside and a configuration that becomes a subject providing the virtual code to the outside.

In one embodiment, the configuration that becomes the subject providing the virtual code may be a communication interface 110 included in the smart card 100. For example, the virtual code may be transmitted by physically contacting the external device 200 through the IC connector 111 included in the communication interface 110. In addition, the virtual code may be transmitted in a wireless communication manner without physically contacting the external device 200 through an antenna 112 included in the communication interface 112. At this time, the smart card 100 may improve security by applying an encryption method used for the financial transaction to the virtual code. Meanwhile, it can be generated as a payment standard, such as the EMV standard, and provided through the communication interface 110.

In addition, in another embodiment, the smart card 100 may include a configuration capable of visually providing the virtual code. For example, the smart card 100 may include a separate display unit 141 and output and provide the virtual code to the display unit 141 so that a user can visually check the virtual code.

On the other hand, the form in which the virtual code is provided visually may be provided as a code value itself composed of a combination of numbers and/or characters, or can be provided in an image code form such as a barcode or a quick response code (QR code).

In addition, in another embodiment, the virtual code can be visually displayed on a screen of a user terminal from the smart card 100 through software and applications that are installed on or embedded in the user terminal serving as the external device 200. That is, even if the display unit 141 is not provided in the smart card 100, the virtual code can be output through the screen of the user terminal. For example, as described below, the smart card 100 may generate the virtual code according to receiving the first power from the user terminal that is the external device 200, and transmit the virtual code to a dedicated application in the user terminal through wireless communication (for example, NFC communication). Thereby, the user can visually check a real-time virtual code of the smart card 100 in the dedicated application.

The external device 200 is any device that supplies the first power to the smart card 100 when the financial transaction using the smart card 100 are requested. As a specific example, the external device 200 may be a card reader (for example, an IC card reader or an NFC reader) that is an electronic device for reading a card. For example, as the smart card 100 is manufactured in the same standard as the general IC card or NFC card, it can be used in the same with the existing card reader (for example, an IC card reader or an NFC reader). That is, there is an advantage of using a card reader device and a financial transaction system installed in an affiliated store as they are.

In addition, as another specific example, a user terminal such as a mobile device possessed by a user can serve as the external device 200. For example, when a user needs a virtual code (for example, a virtual card number or a virtual token) for online payment, the user needs to visually receive the virtual code by providing the first power to the smart card 100 without the IC card reader or the NFC reader.

In this case, the user can tag the smart card 100 to the user terminal serving as the external device 200 and receive the first power from the user terminal using short-range wireless communication. Thereby, the smart card 100 may output the virtual code to the display unit 141 provided in the smart card 100 using the first power supplied from the user terminal. In addition, the virtual code may be transferred to the user terminal in a message form or provided through a dedicated application for verification. A specific embodiment will be described below with reference to the exemplary drawings.

In one embodiment, the external device 200 may serve not only to supply the first power to the smart card 100, but also to communicate with the smart card 100 to receive the virtual code and process the financial transaction request. At this time, the form of processing the financial transaction request may be variously performed, such as the external device 200 approving the financial transaction itself or transmitting the financial transaction information to the server 300.

On the other hand, in another embodiment, the external device 200 serves only to supply the first power to the smart card 100, and a separate device for processing the financial transaction request can also be provided.

In one embodiment of the present disclosure, a system for generating and providing a smart-based virtual code may further include a server 300.

In one embodiment, the server 300 is a virtual code verification server that verifies the virtual code generated by the smart card 100.

As a specific example, the virtual code verification server may be a virtual token verification server (that is, token service provider server; TSP server) or a financial company server.

The "virtual token verification server" is a server that stores the actual card number and searches for the actual card number based on the virtual token and provides it to a payment service server or the financial company server.

The "financial company server" is a server that searches for the actual card number using the virtual code (that is, a virtual card number) and determines whether to approve payment based on the searched actual card number.

The server 300 serves to determine whether to approve payment based on the actual card number, including the virtual code verification means or to search for the actual card number based on the virtual code, and to verify the virtual code. Meanwhile, the role can be performed through the external device 200 instead of the separately configured server 300.

Figure 2:
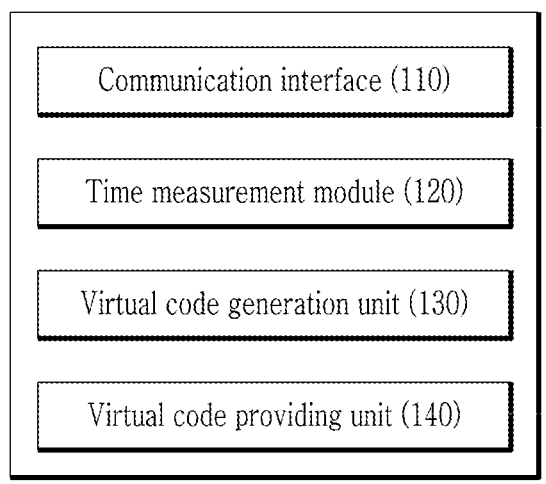
FIG. 2 is a configuration diagram of a smart card according to an embodiment of the present disclosure.

FIG. 2 is a configuration diagram of a smart card according to an embodiment of the present disclosure.

Referring to FIG. 2, the smart card 100 according to the embodiment of the present disclosure includes the communication interface 110, the time measurement module 120, a virtual code generation unit 130, and a virtual code providing unit 140.

The communication interface 110 serves to allow the smart card 100 to receive the first power used to generate the virtual code from the external device 200 and to communicate with the external device 200 to transmit and receive information.

In one embodiment, the communication interface 110 includes the IC connector 111 or the antenna 112.

The IC connector 111 is used when the smart card 100 is used in a contact type, such as being inserted into the external device 200, and the antenna 112 is used when the smart card 100 is used in a contactless type through wireless communication.

The IC connector 111 is a contact pad that is exposed so that a circuit pattern included in the smart card 100 can contact the outside. When the smart card 100 is used as the contact type, the IC connector 111 physically contacts the external device 200 to receive the first power from the external device 200.

The antenna 112 is a configuration that performs wireless communication necessary to use the smart card 100 in the contactless type, and serves to detect radio frequency signals around the smart card 100, exchange data, and communicate with the external device 200. When the smart card 100 is used as the contactless type, the antenna 112 does not physically contact the external device 200, and receives the first power from the external device 200.

Meanwhile, the antenna 112 is an arbitrary antenna such as a loop antenna or a coil antenna, and is not limited in type. In addition, the antenna 112 may be embedded separately from the IC chip in the smart card, or may be provided in the IC chip.

The time measurement module 120 serves to continuously measure the time data, which is the basis of the time count that is the basis of the virtual code generation, from the specific time point (for example, time point to start using a card or time point to manufacture a card).

The time count is a value counted based on time data measured from the initial time value given based on the specific time point to the time point when the user requests the financial transaction, and even when the same smart card 100 is repeatedly used, the transaction request time point of the user will be different each time, and therefore the time data measured up to the transaction request time point and the time count counted based on the measured time data also has a different value at all times. Therefore, the time data in the present disclosure plays a key role in generating the a virtual code that does not overlap each time according to the transaction request time point. In addition, the virtual code can be generated so that the virtual code does not overlap every time regardless of when the virtual code is generated and the user, and as a result, the virtual code at the specific time point is a virtual code that cannot be used after the corresponding time point even when being leaked, such that the financial damage that can occur due to the leakage of the virtual code or the actual card information can be prevented, and thus the security can be enhanced.

In one embodiment of the present disclosure, the time measurement module 120 includes the clock 121 and the clock battery 122.

The clock 121 measures the time data measured from the initial time value given based on the specific time point of the smart card 100 to the user's transaction request time point. In the present disclosure, it is not necessary for the smart card 100 to receive the separate time data or the like from the outside in order to measure the time data. That is, the time data is measured without the communication with the outside in the smart card 100 itself, and as a result, more enhanced security can be provided.

In one embodiment, the clock 121 should not operate only at the user's transaction request time point, but continuously operate from the time of manufacturing a card and measure the time data. Accordingly, unlike the virtual code generating unit 130 and the virtual code providing unit 140 that operates only when the user requests a financial transaction, the clock 121 needs to be continuously supplied with power. Therefore, the power ("first power" in this specification) supplied to the virtual code generating unit 130 and the virtual code providing unit 140 and the power ("second power" in this specification) supplied to the clock 121 are distinguished.

As described above, the first power is not power supplied from the inside of the smart card 100, but is power received by the smart card 100 from the external device 200 when the user requests the financial transaction. Therefore, the power is supplied only during the financial transaction, and the virtual code generating unit 130 and the virtual code providing unit 140 also operate only during the financial transaction to generate and provide the virtual code.

On the other hand, unlike the first power, the second power is power supplied from the inside of the smart card 100 itself. The time measurement module 120 of the smart card 100 includes the clock battery 122. The clock battery 122 is an internal battery provided in the smart card 100 that supplies power only to the clock 121. The clock battery 122 does not supply power to other components than the clock 121, so a large capacity is not required, and may be a battery having a capacity capable of supplying power only for a specific period.

Considering that the battery life of the existing one time password (OTP) card is an average of 3 years in relation to the life of the clock battery 122, the life of the clock battery 122 of the present disclosure has no problem in continuously supplying power without the battery being discharged during the use period of the smart card 100 of the user.

On the other hand, in one embodiment, the clock battery 122 is replaced for every constant period, or the user can charge the clock battery 122 by himself/herself by providing a rechargeable smart card 100. In addition to this, the smart card 100 may also be provided so that the user of the smart card 100 can check the remaining life of the clock battery 122.

The virtual code generation unit 130 serves to generate the virtual code based on the time count counted based on the time data measured by the clock 121 through the virtual code generation function. As described above, when the virtual code generation unit 130 is connected to the external device 200 in a contact or contactless type only when the user requests a financial transaction, the virtual code operates by receiving the first power from the external device 200 to generate the virtual code.

Meanwhile, in one embodiment, the virtual code may be generated by combining a plurality of detailed codes used to verify the virtual code or search for the actual card number matching the virtual code. At this time, the virtual code generation function may include a detailed code generation function that generates the plurality of detailed codes and a detailed code defect function that combines the plurality of detailed codes.

As a specific example, the plurality of detailed codes may include: a first code that sets a start point at which a storage location is searched; and a second code that sets a search path from the start point to the storage location according to a specific search scheme. A detailed description of the step of searching for, by the server 300 the actual card number based on the virtual code or verifying the virtual code will be described later.

The virtual code providing unit 140 serves to provide the virtual code generated by the virtual code generating unit 130 to the outside. As for the method for providing the virtual code to the outside, as described above, there is no limitation in a form in which the virtual code is provided to the outside and the configuration that becomes a subject providing the virtual code to the outside. A detailed description thereof is redundant and therefore will be omitted.

Figure 3:
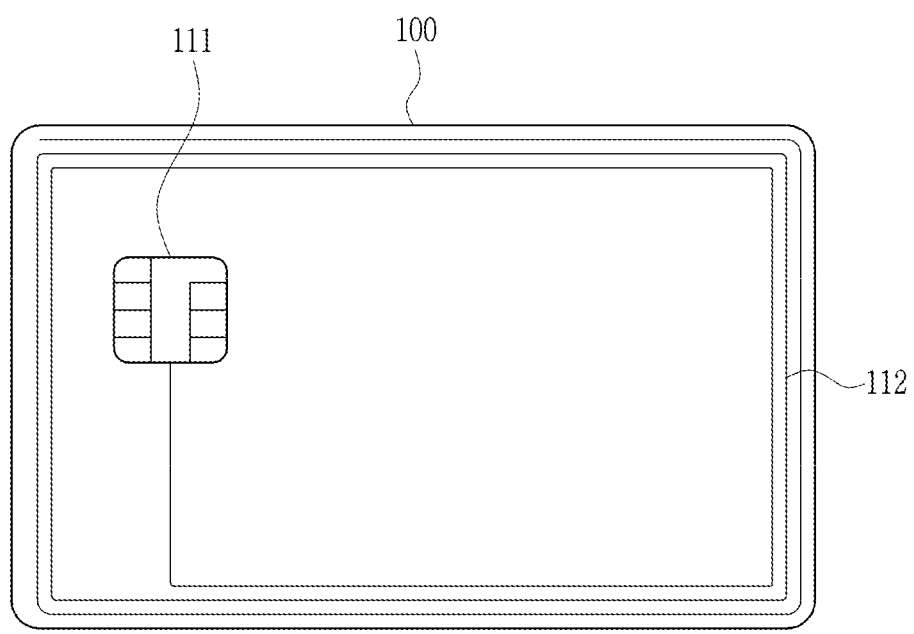
FIG. 3 is an exemplary view of a communication interface included in the smart card according to the embodiment of the present disclosure.

FIG. 3 is an exemplary view of a communication interface included in the smart card according to the embodiment of the present disclosure.

Referring to FIG. 3, the communication interface 110 included in the smart card 100 according to the embodiment of the present disclosure includes one or more of the IC connector 111 or the antenna 112. For convenience, both the IC connector 111 and the antenna 112 are illustrated in FIG. 3, but any one of the IC connector 111 and the antenna 112 can be included, and there is no limitation on a digit where each component is located on the smart card 100. The roles of each of the IC connector 111 and the antenna 112 are redundant with the above-described contents, and therefore will be omitted.

Figure 4:
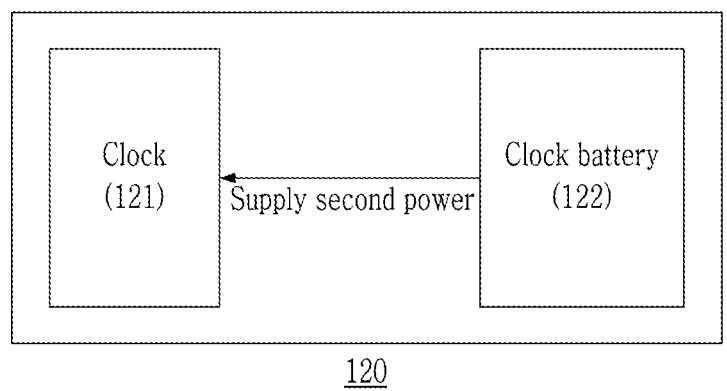
FIG. 4 is a configuration diagram of a time measurement module according to an embodiment of the present disclosure.

FIG. 4 is a configuration diagram of the time measurement module according to the embodiment of the present disclosure.

Referring to FIG. 4, the time measurement module 120 includes the clock 121 and the clock battery 122, and the clock 121 continuously operates by receiving the second power from the clock battery 122. A detailed description of each role is redundant with the above-described contents, and therefore will be omitted.

Figure 5:
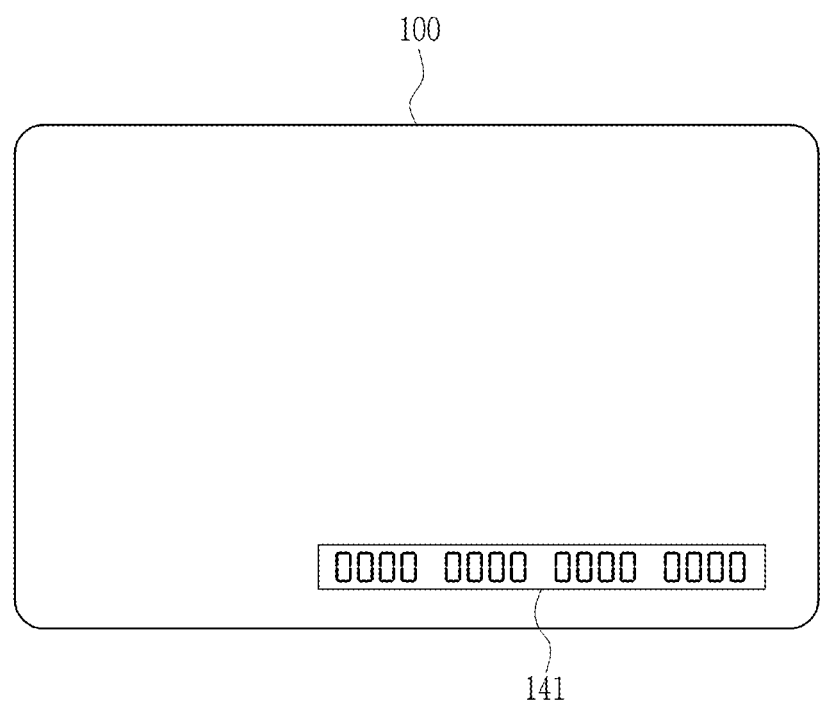
FIG. 5 is an exemplary diagram illustrating a case where a virtual code providing unit according to an embodiment of the present disclosure includes a display unit.

FIG. 5 is an exemplary diagram illustrating a case where the virtual code providing unit according to the embodiment of the present disclosure includes the display unit.

Referring to FIG. 5, as an embodiment of the virtual code providing unit 140, the display unit 141 is illustrated on the exterior of the smart card 100.

In FIG. 5, for convenience, the display unit 141 is illustrated on the lower right, but there is no limitation on a digit where the display unit 141 is located on the smart card 100.

In addition, the output virtual code is illustrated as a number string that matches the number of digits of the actual card number as "0000 0000 0000 0000" for convenience, but as described above, the virtual code can be represented by a code value itself composed of characters and/or numbers, or image codes such as a barcode and a QR code, but the form thereof is not limited. The virtual code may be of any form visually provided.

On the other hand, in one embodiment, the display unit 141 is not limited to types such as a general flat panel display, LCD, LED, OLED, and a flexible display, and as a specific example, may be electronic paper (E-Paper). The electronic paper is a display technology that applies the characteristics of general ink to paper, and unlike the flat panel display that use a backlight to make pixels shine, uses reflected light like ordinary paper. Therefore, the virtual code once output can be displayed without power consumption and is not damaged when folded or bent.

Figure 6:
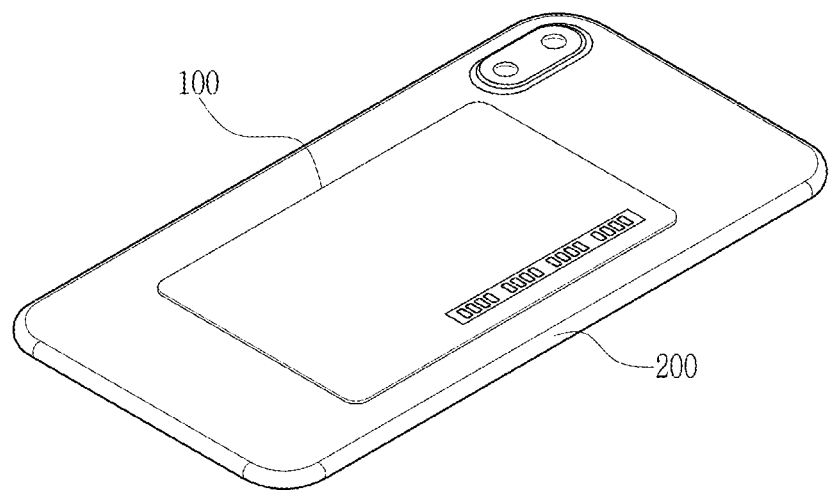
FIG. 6 is an exemplary view illustrating a state in which the smart card according to the embodiment of the present disclosure is used by being tagged to a user terminal.

FIG. 6 is an exemplary view illustrating a state in which the smart card according to the embodiment of the present disclosure is used by being tagging to the user terminal.

As illustrated in FIG. 6, when the user terminal such as the mobile device possessed by the user serves as the external device 200, the smart card 100 is tagged to the user terminal and is connected to wireless communication with the user terminal to receive the first power, thereby performing the financial transaction.

FIG. 6 illustrates that when the smart card 100 equipped with the display unit 141 is tagged to the user terminal, the virtual code is output through the display unit 141, but the virtual code can be provided to the user terminal in the form of a message or the virtual code can be provided through software embedded or installed in the user terminal. This can be useful for online payment, and can also be used for a case for directly inputting or visually checking the virtual code in an offline store if necessary.

Figure 7:
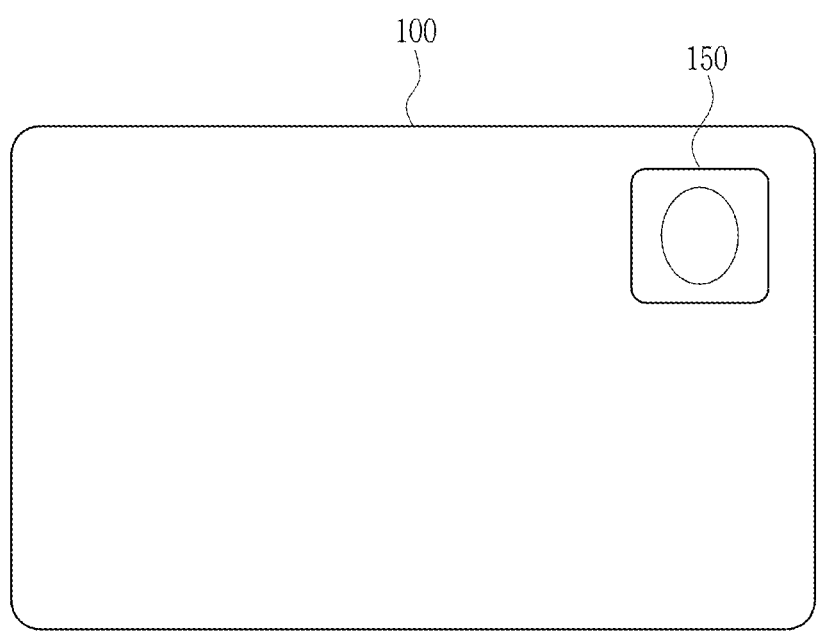
FIG. 7 is an exemplary view illustrating a state in which a fingerprint recognition unit is included in the smart card according to the embodiment of the present disclosure.

FIG. 7 is an exemplary view illustrating a state in which a fingerprint recognition unit is included in the smart card according to the embodiment of the present disclosure.

Referring to FIG. 7, the smart card 100 according to the embodiment of the present disclosure may further include a fingerprint recognition unit 150.

The fingerprint recognition unit 150 serves to recognize a user's fingerprint and verify whether the user who has requested the financial transaction through the smart card 100 is a user who has legitimate usage authority. Therefore, even when the user loses the smart card 100, the fingerprint recognition unit may prevent a third party from acquiring and using the lost smart card, and therefore serves as a primary filtering function, thereby enhancing security.

The fingerprint recognition unit 150 recognizes the user's fingerprint and determines whether the user's fingerprint matches the fingerprint information pre-registered inside the smart card 100 and verifies whether the user has the usage authority. A detailed description thereof will be described below.

Meanwhile, in FIG. 7, for convenience, the fingerprint recognition unit 150 is illustrated to be located at the upper right, but there is no limit on a digit where the fingerprint recognition unit 150 is located on the smart card 100.

Figure 8:
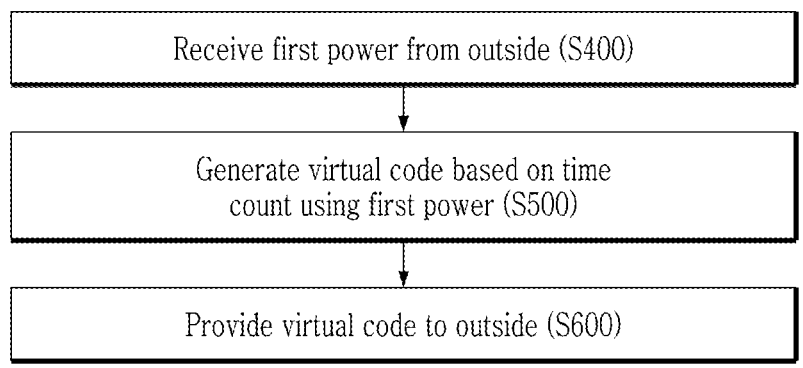
FIG. 8 is a flowchart of a method for generating and providing, by a smart card, a virtual code according to an embodiment of the present disclosure.

FIG. 8 is a flowchart of a method for generating and providing, by a smart card, a virtual code according to an embodiment of the present disclosure.

Referring to FIG. 8, a method for generating and providing, by a smart card 100, a virtual code according to an embodiment of present disclosure includes receiving the first power from the outside (S400), generating the virtual code based on the time count using the first power (S500), and providing the virtual code to the outside (S600).

In step S400, the smart card 100 is connected to the external device 200 in the contact or contactless type at the time of the transaction request to receive the first power from the external device 200, in step S500, the smart card 100 uses the first power to generate the virtual code based on the time count measured by the time measurement module 120, and in step S600, the smart card 100 provides the generated virtual code to the outside. A detailed description of each step is redundant with the above-described contents, and therefore will be omitted.

Figure 9:
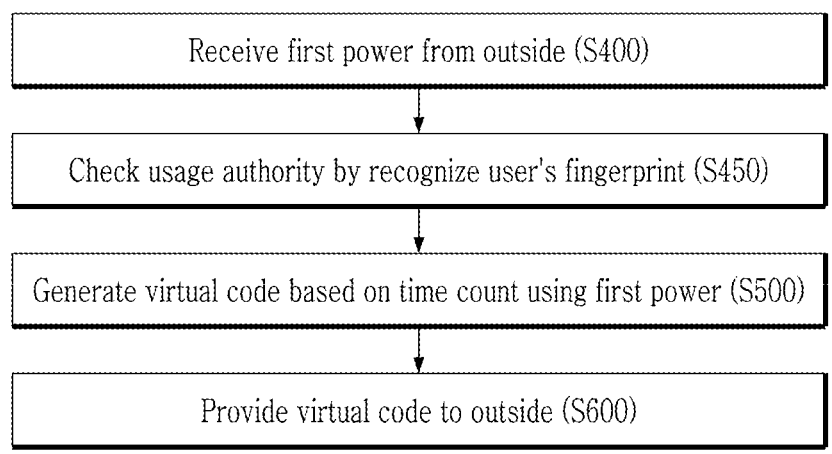
FIG. 9 is a flowchart of a method for generating and providing, by a smart card, a virtual code when the fingerprint recognition unit according to the embodiment of the present disclosure is added.

FIG. 9 is a flowchart of a method for generating and providing, by a smart card, a virtual code when the fingerprint recognition unit according to the embodiment of the present disclosure is added.

Referring to FIG. 9, compared to FIG. 8, the method for generating and providing, by the smart card 100, the virtual code further includes recognizing usage authority by recognizing a user's fingerprint (S450), which will be mainly described.

In step S450, as an embodiment, when the smart card 100 further includes the fingerprint recognition unit 150, the fingerprint recognition unit 150 recognizes the user's fingerprint and checks whether the recognized user's fingerprint matches a user's fingerprint with the pre-stored legitimate authority. For example, if the pre-stored fingerprint information and the input fingerprint information do not match, the smart card 100 may not perform the virtual code generation procedure. As another example, the smart card 100 separately performs the fingerprint recognition and the virtual code generation, and if the pre-stored fingerprint information and the input fingerprint information do not match, may request a separate user authentication procedure (for example, input a PIN number to a financial transaction terminal).

In one embodiment, the user is issued the smart card 100 and goes through a user registration process.

As a specific example, the smart card 100 in the initial state issued to the user may have a small amount of power sufficient to perform the user registration process, and in this case, the above-described clock battery 122 may be used or provided separately. The user registers user information on the smart card 100 using the small amount of power, and the user information includes the fingerprint information of the user. Thereby, the smart card 100 stores and manages the fingerprint information of the user who has the legitimate usage authority, and it is also possible to add, change, or register a user afterwards.

Figure 10:
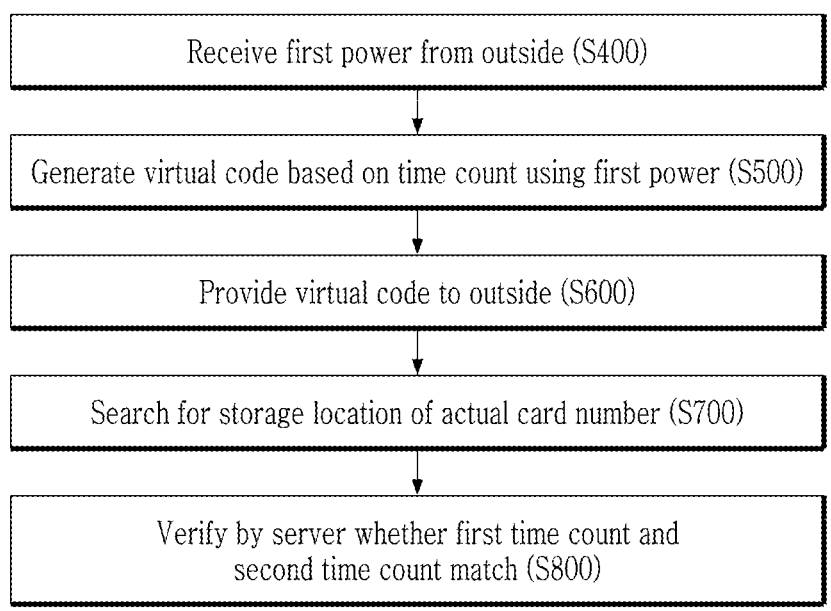
FIG. 10 is a flowchart of a method for generating and providing, by a smart card, a virtual code when a step of verifying whether time counts match according to the embodiment of the present disclosure is added.

FIG. 10 is a flowchart of a method for generating and providing, by a smart card, a virtual code when the step of verifying whether the time counts according to the embodiment of the present disclosure match is added.

Referring to FIG. 10, compared to FIG. 8, the method for generating and providing, by the smart card, the virtual code further includes searching for a storage location of an actual card number (S700) and verifying whether a first time count and a second time count match in the server (S800).

In step S700, the server 300 searches for a unit count (storing location) in which the actual card number matching the virtual code received by a storage location search algorithm is stored using a virtual code verification means. A detailed description of the virtual code verification means and the search method will be described below.

In step S800, the "first time count" is a time count counted based on the time data measured by the time measurement module 120 of the smart card 100, and the "second time count" is a time count counted based on the time data that the server 300 measures on the smart card 100. That is, the first time count is a time count counted based on the time data measured based on a time flow of only the clock 121 without the clock 121 receiving separate time data from the outside, and the second time count is a time count counted based on the time data that the server 300 measures based on a global positioning system (GPS) and the like.

When verifying the virtual code received from the external device 200, the server 300 checks whether the first time count and the second time count match to verify whether the received virtual code is a virtual code normally generated at the time of the corresponding transaction request point. A detailed description of the verification step will be described below.

Figure 11:
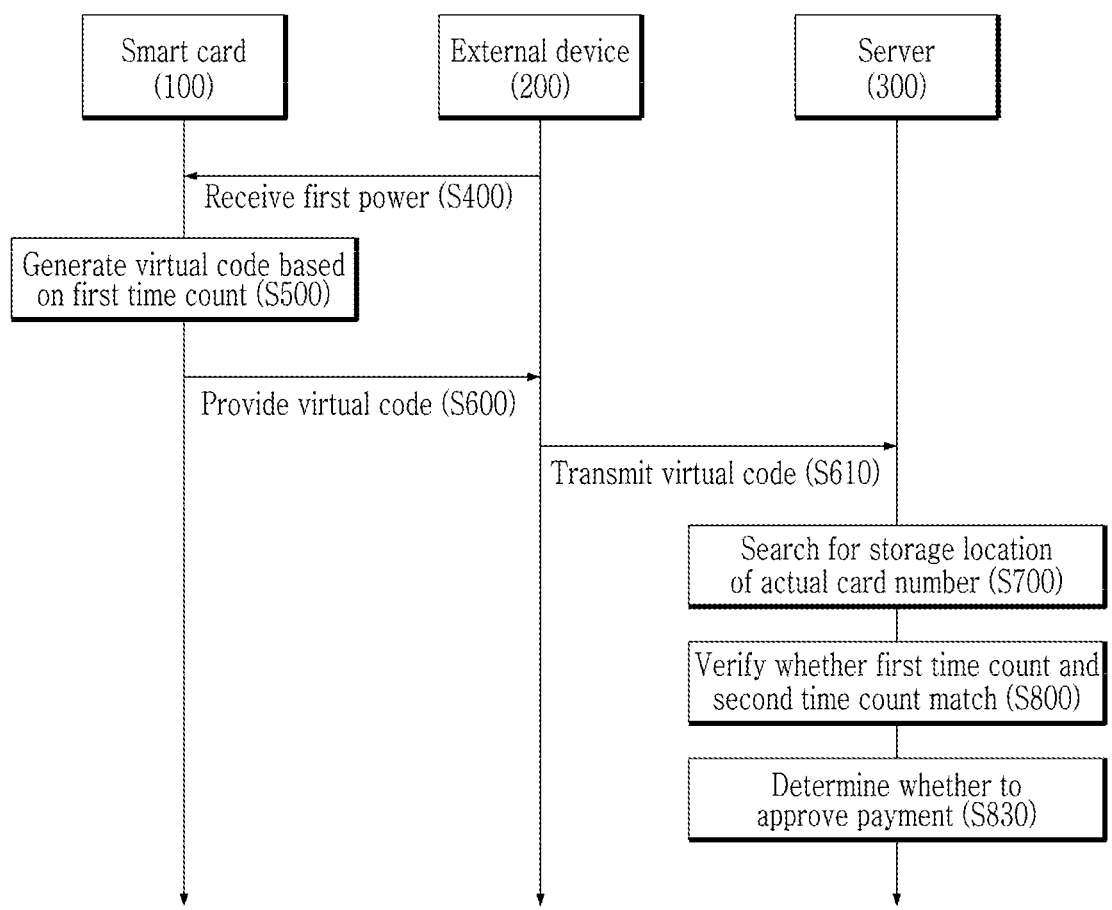
FIG. 11 is a flowchart illustrating in detail the step of verifying whether the time counts matches according to the embodiment of the present disclosure.

FIG. 11 is a flowchart illustrating in detail the step of verifying whether the time counts matches according to the embodiment of the present disclosure.

Referring to FIG. 11, the virtual code generated by the smart card 100 through steps S400 to S600 is provided to the external device 200.

The external device 200 transmits the provided virtual code to the server 300 (S610). FIG. 11 illustrates that steps S700 to S830 are performed by the server 300 for convenience, but can be performed in the external device 200 itself.

The server 300 searches for the storage location of the actual card number matching the received virtual code (S700), verifies whether the first time count based on the received virtual code matches the second time count measured by the server 300 itself (S800), and determines whether to approve the corresponding financial transaction according to the verification result (S830). A detailed description thereof will be provided below with reference to FIG. 12.

Figure 12:
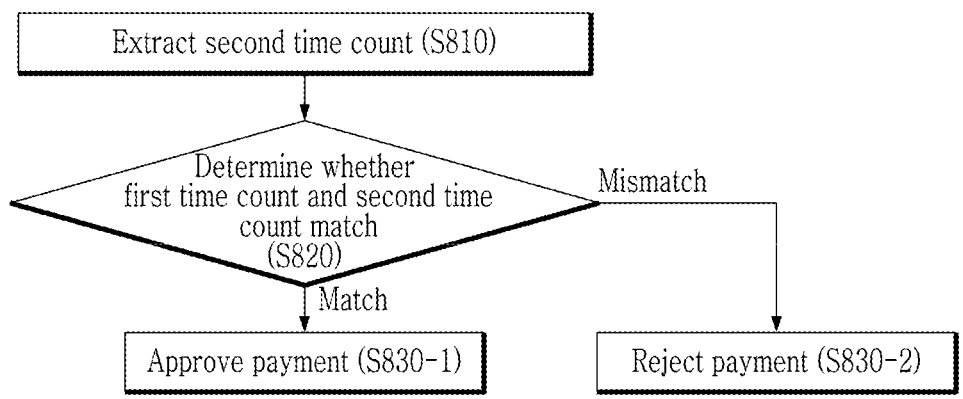
FIG. 12 is a flowchart schematically illustrating the step of verifying whether the time counts match and determining whether to approve payment according to an embodiment of present disclosure.

FIG. 12 is a flowchart schematically illustrating the step of verifying whether the time counts match and determining whether to approve payment according to an embodiment of present disclosure.

Referring to FIG. 12, the step (S800) of verifying whether the first time count and the second time count match in the server 300 includes extracting the second time count (S810), determining whether the first time count and the second time count match (S820), and determining whether to approve payment (S830-1 and S830-2).

In step S810, the server 300 extracts the second time count corresponding to the searched actual card number.

In step S820, the server 300 compares the extracted second time count with the first time count to determine whether the second time count and the first time count match. As the determination result, the server 300 approves payment when the first time count and the second time count match to process the requested financial transaction, and rejects the requested financial transaction if the first time count and the second time count mismatch (S830-1 and S830-2).

On the other hand, as an embodiment, in step S820, even if the first time count and the second time count do not perfectly match, it may be determined that when the difference between the first time count and the second time count falls within a specific error range, the first time count and the second time count match. This is to allow more flexible verification in consideration of the possibility that an error has occurred in the first time count measured by the smart card 100 or the second time count measured by the server 300.

As a specific example, the server 300 sets an error range by a specific count before and after the second time count measured by the server 300, and if the first time count has a count value within the range, determines that the first time count and the second time count match, thereby approving payment.

In addition, in one embodiment, the server 300 may store and manage a time correction values in the unit count matching the actual card number.

The "time correction value" is specified based on an error history measured for each user, and is a different value depending on a user, a use mode, and a use frequency. That is, the time correction value is not a fixed value, but is a value specified based on measured and recorded data for each user.

The server 300 verifies whether the time correction value matches the second time count based on the value reflected in the first time count. Thereby, it is possible to minimize the transaction failure occurring due to the basic error that can occur in the time value measured by the time measuring device, and the time correction value considering different use habits for each user is used, so more accurate time count verification can be made.

Hereinafter, a method for searching for a storage location of an actual card number based on a virtual code will be described in detail.

In one embodiment, the server 300 may include the same virtual code generation function as the smart card 100. That is, the server 300 may check whether the virtual code generated using the same virtual code generation function and the virtual code received from the smart card 100 are the same to verify whether the virtual code is a virtual code normally generated and may search for the actual card number matching the virtual code.

In one embodiment, the virtual code may be generated by combining the plurality of detailed codes used to verify the virtual code or search for the actual card number matching the virtual code. When the plurality of detailed codes include the first code and the second code, the server 300 searches for the storage location of the actual card number in the storage location search algorithm using the first code and the second code.

As a specific example, the server 300 may use the first code that sets a start point at which the storage location included in the plurality of detailed codes is searched, and a second code that sets a search path from the start point to the storage location according to a specific search scheme to verify whether the received virtual code is the virtual code normally generated, and may search for the storage location of the actual card number matching the virtual code.

In one embodiment, the server 300 sets the location corresponding to the first code as the start point, and searches for a point (that is, a particular vertex of a k polygon) matching the actual card number in a k-polygon arrangement state based on the second code according to the search scheme applied to the second code. The actual card number matches each vertex of the k polygon. A point where a first code track (that is, first track) and the k polygon correspond to each other becomes a start point at which a storage location corresponding to the first code is searched. The server 300 searches for a matching point of the card storage location for authentication based on the second code at the search start point.

Various methods can be applied as a method for searching for a actual card number in a k polygon based on a second code. For example, as indicated by an angle (for example, a specific angle at which 180° is divided into $M^N$ numbers to face the vertices of the k polygon) corresponding to the second code at a location on the first track that the k polygon contacts, the server 300 may search for the vertices of the k polygon, which are the storage location of the actual card number, based on the virtual code.

Further, as another example, in the state in which the k polygon is in contact with the point corresponding to the first code on the first track, the server 300 divides the overall center angle (that is, 360°) divided into $M^N$ numbers based on a center of the k polygon and a contact point on the first track, and matches each angle to $M^N$ second codes. At this time, a direction of a line moving a specific number of unit angles (that is, $360°/M^N$) from a line connecting the center of the k polygon and the contact point on the first track becomes a specific vertex of the k polygon. Accordingly, when the second code corresponding to the specific angle is received, the server 300 may search for a vertex located in the corresponding angle direction.

In addition, as another example, a specific digit of the second code may be used to determine a angle calculation direction. That is, when the second code is generated using N characters (N is a natural number), an angle measurement direction may be determined by one digit. For example, when the server 300 divides the entire center angle (that is, 360°) based on the center of the k polygon and the contact point on the first track, and matches the second code to each angle, it may be determined by a value one digit whether the angle is an angle measured in a left or right direction from the line connecting the contact point on the first track.

The method for searching for the storage location of the actual card number in the k polygon based on the second code is not limited thereto, and various methods such as a method for searching for, as a storage location, the point where the point on the k polygon corresponding to the second code and the contact point on the first track are divided at a specific ratio can be applied.

In addition, in another embodiment, the storage location search algorithm moves on the track based on the plurality of detailed codes constituting the virtual code to move to the point matched with the storage location of the actual card number. For example, the point matching the storage location of the actual card number may be the point on the track corresponding to the count (that is, the time point) that issues the actual card number to the virtual code generation means.

Specifically, when the virtual code includes the first code generated based on the time elapsed from the time point when the virtual code generation function is driven and the second code generated based on the time elapsed from the time point when the actual card number was issued to the specific virtual code generation means, the virtual code verification means sets, as the search start point, the count on the track where the code value corresponding to the first code matches, and searches for the point on the track by returning along the track from the search start point by the count value calculated by applying a reverse function of the second function (or the extraction code generation function when the extraction code is used as the second code) to the second code to search for the point on the track at the time point (that is, point matching the storage location of the actual card number) when the actual card number is issued to the virtual code generation means.

In addition, as another specific example, the virtual code verification means 20 arranges a moving track (that is, a second moving track) for the second code arranged in parallel with a moving track (that is, a first moving track) for the first code in a reverse direction to the moving direction according to the first code, with the search start point moving by the first code at an origin point. Then, the virtual code verification means moves to the location of the code value corresponding to the second code on the second moving track, and searches for the point on the first moving track corresponding to this location as the storage location of the actual card number.

Thereafter, the virtual code verification means requests the financial transaction with the actual card number extracted from the storage location.

Hereinafter, an algorithm for generating a virtual code using only numbers will be described.

In order to use the virtual code while maintaining the existing financial transaction system (for example, a POS device and a PG company server when the financial transaction is payment at a store) as it is, the smart card 100 needs to generate, as the virtual code, the code having the same number of digits as the actual card number.

In one embodiment, the smart card 100 generates the virtual code by combining the plurality of detailed codes, but generates a detailed code so that the code has the same number of digits as the actual card number. For example, the virtual code may be generated by combining the plurality of detailed codes such as fixed code, an OTP code, a conversion code, and an extraction code according to specific rules. To this end, the virtual code generation function may include an OTP function that generates the OTP code, an extraction code generation function, and a detailed code combination function.

In one embodiment, the smart card 100 generates the OTP code based on the OTP function stored therein at the time point when the virtual code generation is requested. The smart card 100 generates the OTP code by reflecting the count (that is, the time point when the virtual code generation corresponding to the actual card number is requested for the financial transaction from the user) for which the OTP code generation is requested based on specific seed data (or serial number). The OTP code is generated in a specific number of number array based on the OTP function, and is used to calculate the conversion code. That is, when the virtual code is transmitted to the virtual code verification means (for example, the virtual code verification server), the virtual code verification means searches for the conversion code based on the OTP number, and then uses the conversion code as the first code or the second code used to search for the storage location of the actual card number.

In one embodiment, the smart card 100 uses, the seed data of the OTP function, a count that issues the actual card number from the financial company server to a specific user or registers the actual card number in the virtual token verification server. That is, the virtual code verification means (that is, the financial company server or the virtual token verification server) uses, as the seed data, the actual card number issuance count or the actual card number registration count distinguished for each user. Thereby, the virtual code verification means can use the OTP code extracted from the virtual code to search for the count that the actual card number was issued or registered. Thereby, since the actual card numbers of other users are registered or issued, the smart card 100 uses different seed data to drive the OTP function. That is, the smart card 100 may generate different OTP codes at the same time point for each user as each user uses different actual card number registration or issuance counts as the seed data.

The OTP code generated in the smart card 100 is used to calculate the conversion code used as the first code or the second code in the virtual code verification server. That is, the OTP code is input to a conversion code generation function as a seed value and is used to generate a specific conversion code. The conversion code generation function can be stored in the virtual code verification server. In addition, when the conversion code is used for the extraction code generation function as the seed value, the smart card 100 may include the conversion code generation function to generate the conversion code with the OTP code.

In one embodiment, the conversion code may be matched one-to-one with the OTP code according to the specific rule. That is, the conversion code generation function may have a one-to-one matching relationship between the OTP code and the conversion code having different digits.

Further, in another embodiment, the conversion code is calculated by inputting the count value requested to generate the OTP code and the virtual code to the conversion code generation function as the seed value. That is, the conversion code generation function uses the count value requested to generate the OTP code and the virtual code as the seed value, and as a result, different conversion codes may be generated according to the count value even if the same OTP value is used as the seed value. Thereby, when the OTP code is a number string having fewer digits than the conversion code, conversion codes having the larger number of cases than the OTP code can be used as the first code or the second code used to search for the storage location of the actual card number.

In addition, in another embodiment, when the fixed code is newly assigned to a virtual code of a specific card type, the smart card 100 may generate a specific number combination that is arranged in a digit of an available period as a variable code, and may use the variable code and the OTP code as the seed value (that is, variable) of the conversion code generation function. That is, the conversion code is generated by using the variable code and the OTP code as the seed value.

The number combination arranged in the available period is generated by being changed for each unit count, and can be used as an actual available period, and is included within a maximum period from the current count. To avoid errors in the payment system, the available period should be a value within the available period from the current time point. For example, when the available period of the actual card is 5 years, the smart card 100 generates a number combination corresponding to a monthly combination within 5 years from the time point when payment is requested according to a specific rule.

Thereby, the number difference between the combination of the OTP code and the variable code and the conversion code is reduced. For example, when a combination of numbers within 5 years is used within the available period, and 3 digits as the OTP code and 9 digits as the conversion codes are used as only numbers, the combinations of the variable codes and the OPT codes become $60*10^3$, so the difference in the number of cases is reduced compared to when only the OTP codes are used as the seed value without the variable codes.

The smart card 100 serves to generate the extraction code used as the first code or the second code used to search for the storage location of the actual card number in the virtual code verification means (for example, the virtual code verification server). When the virtual code verification means uses the conversion code calculated based on the OTP code as the first code, the virtual code verification means uses the extraction code as the second code. That is, the conversion code or the extraction code is used as the first code or the second code, respectively, depending on the conditions set by the virtual code verification means. The first code is to set the start point for searching for the storage location of the actual card number in the virtual code verification means, and the second code is to set the search path from the start point to the storage location according to the specific search method. Specifically, the extraction code corresponds to the conversion code calculated from the OTP code generated in the same count, so the virtual code verification means searches for the storage location of the actual card number using the extraction code in the virtual code of the specific count and the OTP code in the virtual code of the specific count.

In addition, the matching relationship between the conversion code and the extraction code and the first code and the second code may be preset in the smart card 100 and the virtual code verification means (for example, the virtual code verification server). If the matching relationship between the conversion code and the extraction code and the first code and the second code is applied reversely, the virtual code verification server cannot search for the storage location of the actual card number, and therefore the matching relationship is preset at the time of issuing the virtual code generation device or storing the virtual code generation function.

In one embodiment, the smart card 100 includes the extraction code generation function that has a correlation with the OTP function. That is, the smart card 100 is used with the conversion code based on the OTP code generated at a specific count, and includes a function for generating a code value capable of searching for the storage location of the actual card number at the same count as the extraction code generation function.

In addition, in another embodiment, the smart card 100 may input the OTP code itself to the extraction code generation function as the seed value to generate the extraction code (that is, extraction code having a correlation with the conversion at a specific count) capable of finding the storage location of the actual card number along with the conversion code. In addition, in another embodiment, the smart card 100 includes the conversion code generation function that calculates the conversion code based on the OTP code in the same way as the virtual code verification server, and may generate the conversion code based on the OTP code generated by the smart card 100 and input the conversion code to the extraction code generation function as the seed value to generate the extraction code.

The extraction code is generated as all or part of numbers obtained by excluding the number of fixed codes and OTP codes from the total number of virtual codes. That is, the smart card 100 arranges the number string in which the extraction code and the OTP code are combined in all or part of the number of digits (when the card identification number is 16 digits and the card security code is 3 digits, a total of 23 digits) excluding the available period (for example, 4 digits) and the fixed code (for example, 6 digits) from the virtual code (for example, 13 digits a range excluding the fixed code and including a card security code range within the card identification number). For example, when the last digit of the card identification number is used as a check digit, the smart card 100 arranges the number string in which the extraction code and the OPT code are combined in the remaining digits (for example, 12 digits) excluding the check digit. Specifically, the virtual code generation unit 130 combines the OTP code and the extraction code through the detailed code combination function, and lists the combined OTP code and extraction code in the digit excluding the fixed code from the card identification number and the digit of the card security code.

In addition, in another embodiment, the smart card 100 generates the OTP code with fewer digits than the conversion code used as the first code or the second code by the virtual code verification means. For example, the OTP code is generated as the number of card security codes in the actual card number, and the second code is generated as all or part of numbers excluding the fixed code, the OTP code, and the available period from the total number of virtual codes. In other words, if the card security code is 3 digits, the smart card 100 generates the OTP code as 3 digits, and generates the extraction code as 9 digits excluding 6 digits of the fixed code, 4 digits of the available period, 3 digits of the OTP code, and 1 digit of the check number among a total number of 23 card numbers.

Thereby, since the virtual code generation device can use 9 digits from the digit of the limited actual card number for the extraction code, the number of codes that can be used as the extraction code increases, so that security can be improved. In particular, if only numbers are used in the virtual code in order not to modify the existing payment process at all, the extraction code can generate 9 digits with 10 numbers from 0 to 9, so 109 codes can be utilized.

At this time, the conversion code generated based on the OTP code may be generated as the number string having the same number of digits as the extraction code. Thereby, the conversion code and the extraction code can be used as each of the first code or the second code in the virtual code verification server. In addition, as the conversion code with more digits are generated with the OTP code having fewer digits, a large portion of an area (that is, 12 digits) that can be used for the OTP code and the extraction codes within the virtual code can be used for the extraction code.

Therefore, even in the case of generating the virtual code using only numbers, the smart card 100 assigns the number of digits to the extraction code directly used as the first code or the second code, and assigns the OTP code to the remaining digits, thereby improving the security.

Hereinafter, an example of the process of registering the smart card 100 will be described in detail.

In one embodiment, the user receives the smart card 100 registered in the virtual code verification server. For example, when a user applies the issuance of the smart card 100 while using the virtual code generation application or applies a new issuance of the smart card 100 through a financial application or a web, the smart card 100 for the user is registered at a specific location (that is, storage location corresponding to a time point at which the application is issued). The user can receive the smart card 100, and then can use the smart card 100 after confirming receipt without going through a separate registration procedure.

Further, in another embodiment, when the user receives the smart card 100, the user performs a registration procedure through a dedicated application of the smart card 100. For example, as the fingerprint registration is performed while separating the smart card 100 received by the user from the envelope or case, the use start point is stored in the smart card 100, and the use start data is transmitted to the virtual code verification server through the dedicated application to provide the start point. There may be a difference between the use start point input to the smart card 100 and the use start point stored in the virtual code verification server, but the user can correct the use time point in the server in the process of using the smart card 100 for payment.

The smart card 100 according to the embodiment of the present disclosure may perform a financial transaction procedure on a specific actual card number.

In one embodiment, the user may perform the financial transaction procedure using the specific actual card number registered as using the smart card 100 in the virtual code verification server. For example, when online or offline payment is performed by the smart card 100, the virtual code verification server searches for the actual card number registered based on the virtual code and performs payment.

In addition, in one embodiment, the user accesses the smart card 100 using the dedicated application to be able to change the card that performs financial transactions using a dedicated application. That is, when the procedure of changing the card registered in the dedicated application is performed, the virtual code verification server can perform the financial transaction by searching for the actual card number of the changed card based on the virtual code provided from the smart card. That is, the smart card generates and provides the virtual code corresponding to the financial transaction time point based on the virtual code generation function without a separate change, but as the card is changed by the dedicated application, the user may use the virtual code generated from the smart card to perform the financial transaction by the card that he/she wants to use at the present time.

Specifically, when the user wants to change a default card that is registered in the smart card 100 to perform the financial transaction, the user requests the server 300 to change the default card through the dedicated application, and the like. Here, the user selects the default card through the application built in or installed in the user terminal, and the user can request the change of the default card by selecting an image of the card or selecting an identification number.

Thereafter, the server 300 searches for a UID of the smart card 100 based on the virtual card number, extracts the storage location of the actual card number connected to the UID, and changes the default card in the storage location of the actual card number. For example, if the identification number of the preset card by the default card is '1' and the identification number of the default card requested by the user to change is '3', the server 30 stores '3' in the default card setting area. Thereafter, when the payment is requested from the user terminal, the server 300 checks the identification information of the default card, for example, '3' in the default card setting area, and extracts the actual card number corresponding to identification number '3' in the card number storage area, thereby performing the financial transaction.

To this end, the dedicated application may include the same virtual code generation function as the smart card 100 to change the card. Specifically, since the virtual code generated by the same rules as the smart card 100 is required to search for the UID to which the storage location of the actual card number in which the actual card number of the user is stored, the dedicated application includes the same virtual code generation function as the smart card 100.

Steps of the method or algorithm described with reference to the embodiment of the present invention may be directly implemented in hardware, in software modules executed by hardware, or in a combination thereof. The software module may reside in a random access memory (RAM), a read only memory (ROM), an erasable programmable ROM (EPROM), an electrically erasable programmable ROM (EEPROM), a flash memory, a hard disk, a removable disk, a CD-ROM, or in any form of computer readable recording medium known in the art to which the invention pertains.

Although the embodiments of the present invention has been described with reference to the accompanying drawings, those skilled in the art will appreciate that various modifications and alterations may be made without departing from the spirit or essential feature of the present invention. Therefore, it should be understood that the above-mentioned embodiments are not restrictive but are exemplary in all aspects.

The invention claimed is:

1. A smart card for generating and providing a virtual code, comprising:
    a communication interface configured to receive first power from an external device, and communicate with the external device, wherein the communication interface includes at least one of an integrated circuit (IC) connector and an antenna, the IC connector is configured to be supplied with the first power from the external device by physically contacting the external device when the smart card is used as a contact type, and the antenna is configured to be supplied with the first power from the external device without physically contacting the external device when the smart card is used as a contactless type;
    a time measurement module comprising a clock and a clock battery, wherein the clock is configured to generate time data by measuring an elapsed time, which is an amount of time that has passed from an initial time point, and the clock battery is configured to supply second power to the clock through a power line connected between the clock and the clock battery for a specific period of time, and configured to be replaced with a charged clock battery after the specific period of time;
    a virtual code generation unit comprising a hardware processor configured to generate the virtual code based on a time count counted based on the time data using the first power; and
    a virtual code providing unit comprising a hardware processor configured to provide the virtual code to an outside of the smart card,
    wherein the virtual code is generated by using a virtual code generation function, which is stored in the smart card and generates the virtual code that is matched with an actual card number, wherein the virtual code includes information configured to be used to search for the actual card number stored in a virtual code verification server, and wherein the time count is a value counted based on the time data measured from an initial time value given based on a specific time point to a time point when a user requests a financial transaction, and even when the same smart card is repeatedly used, a transaction request time point of a user is configured to be different each time, and therefore the time data measured up to the transaction request time point and the time count counted based on the measured time data also has a different value at all times.

2. The smart card of claim 1, wherein the external device is a user terminal, and the smart card is tagged in the user terminal to be supplied with the first power.

3. The smart card of claim 2, wherein the virtual code providing unit includes a display unit, and outputs the virtual code to the display unit in a code value or an image code form.

4. The smart card of claim 3, further comprising:

a fingerprint recognition unit that recognizes a user's fingerprint to check usage authority, wherein the virtual code generation unit generates the virtual code only when the fingerprint recognized by the fingerprint recognition unit matches previously registered fingerprint information.

5. The smart card of claim 1, wherein it is verified whether the first time count measured by the time measurement module matches a second time count measured by the virtual code verification server, and it is determined that the first time count matches the second time count when a difference between the first time count and the second time count is within a specific error range.

6. The smart card of claim 5, wherein the virtual code verification server stores and manages a time correction value in a unit count matching the actual card number, the time correction value is specified based on an error history measured for each user, and the first time count is verified by reflecting the time correction value.

7. The smart card of claim 1, wherein the virtual code is generated by combining a plurality of detailed codes.

8. The smart card of claim 7, wherein the plurality of detailed codes include:

a first code that sets a start point at which a storage location is searched; and a second code that sets a search path from the start point to the storage location according to a specific search scheme.

* * * * *